(12) United States Patent
Yamazaki et al.

(10) Patent No.: US 11,995,676 B2
(45) Date of Patent: May 28, 2024

(54) MACHINE AND PORTABLE TERMINAL

(71) Applicant: The Coca-Cola Company, Atlanta, GA (US)

(72) Inventors: Yasuhiro Yamazaki, Atlanta, GA (US); Tatsuya Sugawara, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/066,033

(22) PCT Filed: Dec. 22, 2016

(86) PCT No.: PCT/US2016/068246
§ 371 (c)(1),
(2) Date: Jun. 25, 2018

(87) PCT Pub. No.: WO2017/112850
PCT Pub. Date: Jun. 29, 2017

(65) Prior Publication Data
US 2019/0019210 A1     Jan. 17, 2019

(30) Foreign Application Priority Data
Dec. 25, 2015     (JP) ................................ 2015-253333

(51) Int. Cl.
*G06Q 30/00*     (2023.01)
*G06Q 30/0207*     (2023.01)
(Continued)

(52) U.S. Cl.
CPC ......... *G06Q 30/0222* (2013.01); *G07F 9/001* (2020.05); *G07F 9/002* (2020.05);
(Continued)

(58) Field of Classification Search
CPC ........... G06Q 30/0207; G06Q 30/0209; G06Q 30/0237
(Continued)

(56) References Cited

U.S. PATENT DOCUMENTS 6,462,644 B1 * 10/2002 Howell ................ G06Q 10/087
                                                                 700/239
6,584,309 B1 * 6/2003 Whigham .............. G06Q 20/16
                                                                 705/16
(Continued)

FOREIGN PATENT DOCUMENTS

GB     2 451 822 A     2/2009
JP     2002024938 A * 1/2002 ............. G06F 21/31
(Continued)

OTHER PUBLICATIONS

Promoting collaborative mobile payment by using NFC-Micro SD technology; Szu-Hui Wu et al., 2013 IEEE 10th International Conference on Services Computing. (Year: 2013).*
(Continued)

*Primary Examiner* — James A Reagan
(74) *Attorney, Agent, or Firm* — Foley & Lardner LLP (57) ABSTRACT

A machine and process for managing a connection with a portable terminal may include a detector for detecting a person. A transmitter may be configured to transmit a wireless signal in response to the detector detecting a person within a predetermined range of the machine. A receiver may be configured to receive a connection request signal from the portable terminal that has received the wireless signal. An identification unit may be configured to identify, in response to receiving the connection request signal, a portable terminal in communication with the machine, and
(Continued)

establish a connection with the identified portable terminal. The machine may be a vending machine or a beverage dispenser.

12 Claims, 6 Drawing Sheets

(51) Int. Cl.
| | |
|---|---|
| G07F 9/00 | (2006.01) |
| G07F 17/00 | (2006.01) |
| H04L 67/125 | (2022.01) |
| H04W 4/80 | (2018.01) |
| H04L 67/12 | (2022.01) |

(52) U.S. Cl.
CPC ........ *G07F 17/0035* (2013.01); *H04L 67/125* (2013.01); *H04W 4/80* (2018.02); *H04L 67/12* (2013.01)

(58) Field of Classification Search
USPC .................. 705/14.1, 14.12, 14.64, 14.37
See application file for complete search history.

(56) References Cited

U.S. PATENT DOCUMENTS

| | | | | |
|---|---|---|---|---|
| 7,085,556 | B2* | 8/2006 | Offer | G06Q 20/12 455/66.1 |
| 7,356,485 | B2* | 4/2008 | Umemura | G07F 7/00 235/382 |
| 7,489,297 | B2* | 2/2009 | Hohmann | G06F 3/04886 345/157 |
| 7,721,958 | B2* | 5/2010 | Belfer | G07F 9/002 222/2 |
| 8,090,359 | B2* | 1/2012 | Proctor, Jr. | G06Q 20/3224 455/414.3 |
| 8,396,589 | B2* | 3/2013 | Katzenstein Garibaldi | G07F 9/001 700/232 |
| 8,856,045 | B1* | 10/2014 | Patel | G06Q 20/401 705/79 |
| 9,253,264 | B2* | 2/2016 | Robinson | G06Q 30/0268 |
| 9,626,650 | B2* | 4/2017 | Hwang | G06Q 30/00 |
| 9,888,337 | B1* | 2/2018 | Zalewski | H04L 67/10 |
| 10,038,992 | B1* | 7/2018 | Zalewski | H04L 67/10 |
| 10,158,721 | B2* | 12/2018 | Jarnagin, III | H04W 4/70 |
| 10,546,326 | B2* | 1/2020 | Publicover | H04N 21/6582 |
| 2002/0049651 | A1* | 4/2002 | Umemura | G06Q 20/363 705/29 |
| 2005/0107076 | A1 | 5/2005 | Tsuda et al. | |
| 2005/0131577 | A1* | 6/2005 | Ota | G07F 9/001 700/242 |
| 2005/0205666 | A1* | 9/2005 | Ward | G06Q 30/02 235/381 |
| 2005/0253807 | A1* | 11/2005 | Hohmann | G06F 3/04886 345/156 |
| 2008/0154735 | A1* | 6/2008 | Carlson | G06Q 20/20 705/16 |
| 2010/0268792 | A1* | 10/2010 | Butler | G06Q 30/02 715/810 |
| 2010/0297946 | A1 | 11/2010 | Alameh et al. | |
| 2011/0302019 | A1* | 12/2011 | Proctor, Jr. | H04L 63/20 705/14.1 |
| 2012/0136478 | A1 | 5/2012 | Anand et al. | |
| 2012/0265591 | A1* | 10/2012 | Hwang | G06Q 30/00 705/14.1 |
| 2013/0246171 | A1* | 9/2013 | Carapelli | G06Q 20/325 705/14.51 |
| 2014/0040028 | A1* | 2/2014 | King | G06Q 30/0261 705/14.53 |
| 2014/0236728 | A1* | 8/2014 | Wright | G06Q 30/0261 705/14.66 |
| 2014/0372505 | A1* | 12/2014 | Robinson | G06Q 30/0252 709/202 |
| 2015/0039776 | A1* | 2/2015 | Jarnagin, III | H04W 4/70 709/228 |
| 2015/0095128 | A1* | 4/2015 | Mehra | G06Q 30/0238 705/14.23 |
| 2015/0100152 | A1 | 4/2015 | Trevino et al. | |
| 2015/0170130 | A1* | 6/2015 | Patel | G06Q 20/405 705/17 |
| 2016/0012465 | A1* | 1/2016 | Sharp | G06Q 20/321 705/14.17 |
| 2016/0044442 | A1* | 2/2016 | Pacelli | G06Q 20/3224 455/41.1 |
| 2016/0253710 | A1* | 9/2016 | Publicover | H04W 4/21 705/14.66 |
| 2017/0076265 | A1* | 3/2017 | Royyuru | G06Q 20/18 |
| 2017/0083945 | A1* | 3/2017 | Dobyns | G06Q 30/0234 |
| 2017/0092034 | A1* | 3/2017 | Want | G06Q 20/18 |

FOREIGN PATENT DOCUMENTS

| | | | | |
|---|---|---|---|---|
| JP | 2002109617 | A | | 4/2002 |
| JP | 2002367015 | A | | 12/2002 |
| JP | 2003317136 | A | | 11/2003 |
| JP | 2004070883 | A | * | 3/2004 ............ G06F 21/31 |
| JP | 2004248215 | A | | 9/2004 |
| JP | 3818045 | B2 | * | 9/2006 ........ G06Q 10/0875 |
| JP | 3846289 | B2 | * | 11/2006 |
| JP | 2013218466 | A | | 10/2013 |
| JP | 2013218466 | A | * | 10/2013 |
| JP | 2014170283 | A | | 9/2014 |
| JP | 2015184872 | A | | 10/2015 |
| JP | 2015201676 | A | | 11/2015 |
| KR | 1020150075152 | A | | 7/2015 |
| NO | 2003048926 | A1 | | 6/2003 |
| WO | WO-2004046988 | A1 | * | 6/2004 ............ G06F 21/31 |
| WO | 2005091233 | A1 | | 9/2005 |

OTHER PUBLICATIONS

Payment Applications Make E-Commerce Mobile Neal Leavitt; Technology News; 2010 IEEE (Year: 2010).*
• Annual Reports.Com. "2009 Coca-Cola Annual Report." (Dec. 31, 2009) Retrieved online Jan. 9, 2024. https://www.annualreports.com/HostedData/AnnualReportArchive/c/NASDAQ_COKE_2009.pdf (Year: 2009).*
• Szu-Hui Wu et al. "Promoting collaborative mobile payment by using NFC-Micro SD technology." 2013 IEEE 10th International Conference on Services Computing. (Year: 2013).*
Technology News. "Payment Applications Make E-Commerce Mobile Neal Leavitt." 2010 IEEE (Year: 2010).*
International Search Report and Written Opinion corresponding to PCT Application No. PCT/US2016/068246, dated Apr. 17, 2017, 13 pages.
Partial Supplementary European Search Report corresponding to European Patent Application No. EP16880082.9, dated May 28, 2019, 13 pages.
Office Action corresponding to Japan Patent Application No. 2015-253333, dated Jul. 17, 2019, 4 pages.
Extended European Search Report corresponding to Europe Application No. 16880082.9, dated Sep. 17, 2019, 12 pages.
Communication pursuant to Rules 70(2) and 70a(2) corresponding to Europe Application No. 16880082.9, dated Oct. 7, 2019, 1 page.

* cited by examiner

MACHINE AND PORTABLE TERMINAL

CROSS REFERENCE TO RELATED APPLICATIONS

This application is a 371 National Phase Application, which claims the benefit of International Patent Application No. PCT/US16/068246, filed on Dec. 22, 2016, which claims the benefit of Japanese Application No. 2015253333, filed on Dec. 25, 2015, each of which is herein incorporated by reference in their entireties.

TECHNICAL FIELD

The present invention generally relates to a machine and to a portable terminal.

BACKGROUND

Machines, such as vending machines, having a function for awarding points to customers who purchase a product are becoming widespread.

One conventional system exists that provides a communication function afforded by a portable terminal is utilized in order to obtain campaign product purchase information from an offline vending machine, and points are awarded. The system described includes (i) a portable terminal able to wirelessly communicate with a specific server via the Internet, (ii) an offline vending machine equipped with a reader that is enabled for a given time period each time a user purchases a product at least during a predetermined campaign period, and (iii) a campaign server which receives communication from the portable terminal and manages product purchase information relating to the vending machine, at least during the predetermined campaign period.

In the conventional system, points are awarded to the portable terminal held over a vending machine reader. In the conventional system, however, if the portable terminal is not held directly over the vending machine reader, it is not possible to identify the portable terminal to which the points should be awarded.

SUMMARY

To avoid the shortcomings of the conventional system, one embodiment may include identifying a combination of a machine from which a user purchases a product or otherwise performed user interactions, and a portable terminal belonging to that user.

More particularly, a machine may manage a connection with a portable terminal and include a detector for detecting a person, a transmitter for transmitting a wireless signal when the detector has detected the person within a predetermined range of the machine, and a receiver for receiving a connection request signal from the portable terminal that has received the wireless signal. The machine may further include an identification unit for identifying, in accordance with the connection request signal. A portable terminal may connect to the machine, and establish a connection with the identified portable terminal. The machine may be a vending machine.

One embodiment of a machine for managing a connection with a portable terminal may include a detector configured to detect people. A transmitter may be configured to transmit a wireless signal in response to the detector detecting a person within a predetermined range of the machine. A receiver may be configured to receive a connection request signal from the portable terminal that has received the wireless signal. An identification unit may be configured to identify, in response to receiving the connection request signal, a portable terminal connecting to the machine, and (ii) establish a connection with the identified portable terminal.

A portable terminal for managing a connection with a machine may include a launching unit which, in response to receiving a first wireless signal transmitted from the machine, may be configured to determine whether or not a predetermined application installed on the portable terminal has been launched, and to provide a notification to cause launching of the application if said application has not been launched. A receiver may be configured to receive a second wireless signal having a weaker transmission power than the first wireless signal sent from the machine. A reception unit may be configured to receive an operation from a user. A connection request unit, in response to the receiver receiving the second wireless signal and the reception unit receiving the operation, may be configured to send a connection request signal requesting a connection to the machine.

A program for managing a connection between a machine and a portable terminal, and causing the portable terminal to function as (i) a means, in response to a first wireless signal transmitted from the machine being received, for determining whether or not a predetermined application installed on the portable terminal has been launched, and providing a notification to cause launching of the application if said application has not been launched, (ii) a means for receiving a second wireless signal having a weaker transmission power than the first wireless signal sent from the machine, (iii) a means for receiving an operation from a user, and (iv) a means, in response to the second wireless signal being received and the operation being received, for sending a connection request signal requesting a connection to the machine.

Utilizing the principles described herein, it possible to identify a combination of a machine from which a user purchases a product and a portable terminal associated with that user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

First Mode of Embodiment

1. Summary of the System

Figure 1:
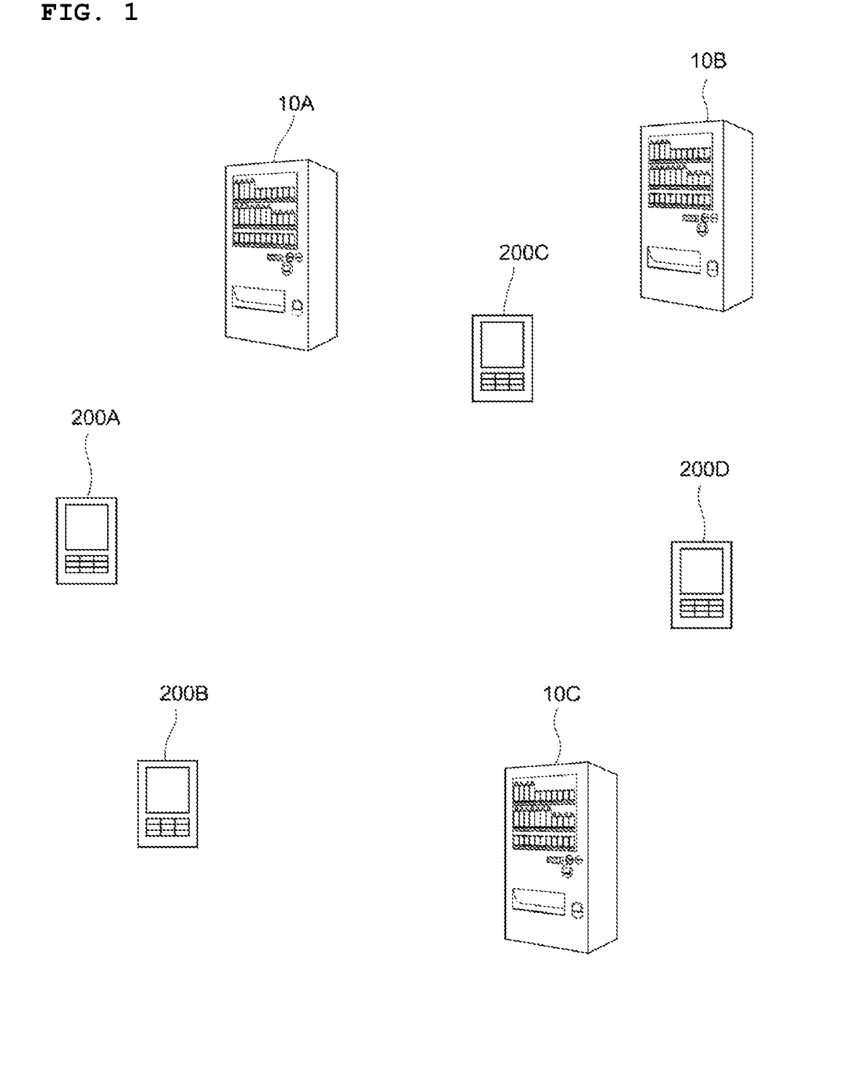
FIG. 1 is a structural diagram of a connection management system according to a first mode of an embodiment.

FIG. 1 is a structural diagram of a connection management system 1 according to this mode of embodiment.

The connection management system 1 may include a system for identifying a combination of a vending machine from which a user purchases a product, and a portable terminal belonging to that user, when the user purchases a product from any vending machine among a plurality of vending machines.

As shown in FIG. 1, the connection management system 1 is such that a plurality of machines 10A-10C, in an embodiment being vending machines, (the machines 10A-10C are referred to collectively below as "the vending machine 10") and portable terminals 200A-200D (the portable terminals 200A-200D are referred to collectively below as "the portable terminal 200") may be connected to one another over a network. It should be noted that the connection management system 1 may include a management server for managing the vending machine 10. Although the machines 10 may be vending machines, it should be understood that the machines may be any other type of machine, including coolers, ATMs, ticket machines, beverage dispensers, post-mix beverage fountain dispenser, food dispensers, kiosks, point-of-sale (POS), or any other machine that enables a user to purchase a product, conduct a transaction, rent a device or equipment, store items, purchase or submit a coupon or other pass identifier for taking a ride (e.g., bus, subway, taxi, vehicle, etc.), or otherwise. In addition, the machine 10 may be configured to provide information, such as an information delivery screen of residents within a building, display that provides directions, display that provides transportation schedules, and the like.

The portable terminals 200A-200D constitute computers able to communicate with the vending machine 10 over a communications network. Specific examples of the portable terminal 200 may include: a mobile telephone, a smartphone, a personal computer (PC), a personal digital assistant (PDA), a tablet, or a wearable terminal. In this mode of embodiment, the example of the portable terminal 200 that is described may be a smartphone on which is installed a predetermined application (also referred to below as an "app") for connecting to the vending machine 10.

The network for the connection management system 1 may include a wireless network. Examples of compliant networks may include: a mobile telephone network, a personal handy-phone system (PHS) network, a wireless local area network (LAN), 3rd generation (3G), long-term evolution (LTE), 4th generation (4G), WiMax (registered trademark), infrared communication, and Bluetooth (registered trademark).

2. Configuration of the Portable Terminal 200

2-1. Hardware Configuration of the Portable Terminal 200

Figure 2:
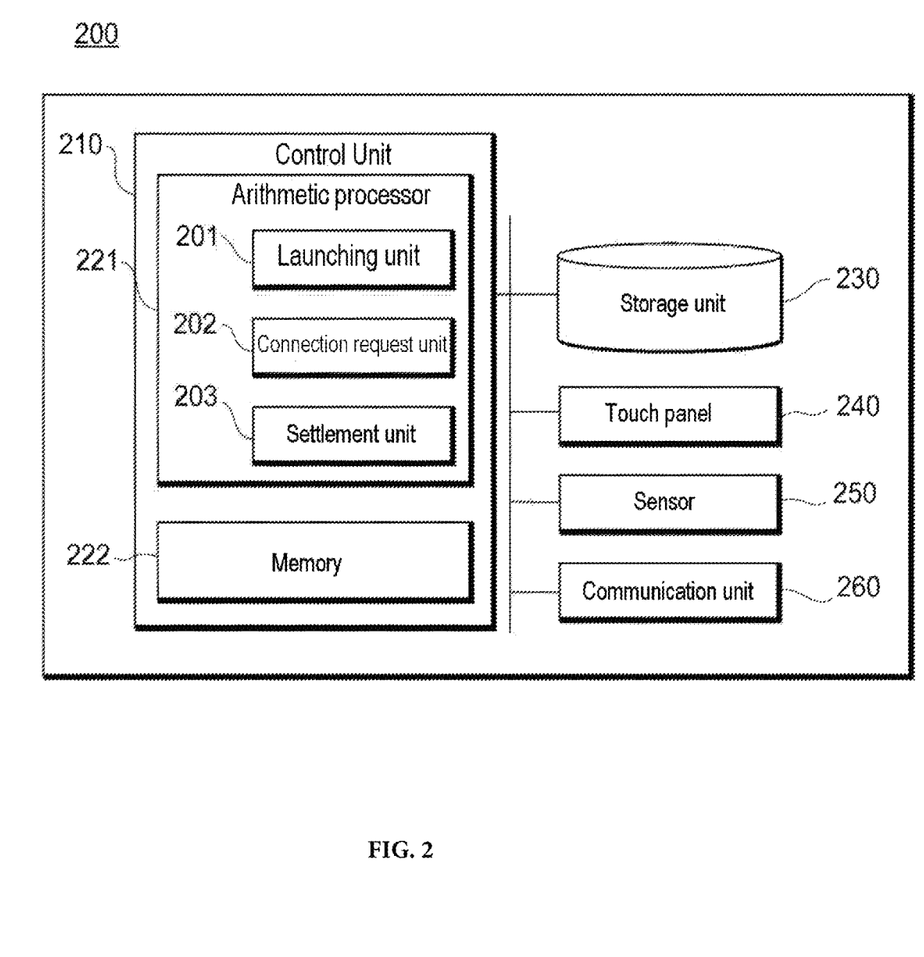
FIG. 2 is a block diagram of a portable terminal according to a first mode of an embodiment.

FIG. 2 is a block diagram illustrating an example of the configuration of the portable terminal 200.

As shown in FIG. 2, the portable terminal 200 may include: a control unit 210, a storage unit 230, a touch panel 240, a sensor 250, and a communication unit 260.

The control unit 210 may include an arithmetic processor 221, such as a CPU or MPU, and a memory 222, such as a random access memory (RAM). The arithmetic processor 221 may cause operation of the various functional units by executing a program stored in the storage unit 230, in accordance with various inputs. The memory 222 serves to temporarily store various types of data used for calculations, etc., during execution of processing in the program.

The storage unit 230 may be a non-volatile storage medium, such as a hard disk drive (HDD) or a flash memory, for example. The storage unit 230 may store an operating system and various programs for realizing the abovementioned features. The storage unit 230 is also able to store data required for implementing various types of programs. These programs and data are loaded, as required, in the memory 222 so that they can be referenced from the arithmetic processor 221.

The various types of data used for running the app may further be stored in the storage unit 230. For example, the storage unit 230 may store a total number of points, a product purchase history, an identifier for the portable terminal 200, and various settings relating to the app.

Points may be awarded to a user according to the monetary amount of a product purchased. When the total number of points reaches a predetermined value, the points may be exchanged for a product or a user may be subscribed to a campaign, for example. The product purchase history may include an identifier for a product purchased, a date and time of purchase, an identifier for the vending machine 10 from which the product was purchased, points added at the time of purchase, and an identifier for "hot" or "cold" in regard to the product purchased, for example. Other product purchase parameters, such as price paid, purchase technique (e.g., cash, credit, debit), card identifier, or otherwise.

The identifier for the portable terminal 200 may include an ID or telephone number, any digits or letters, symbols, or a combination thereof. It should be noted that the identifier for the portable terminal 200 may also be preset by a user.

The various settings relating to the app may refer to information that can be set with respect to the app. For example, when a connection request signal that is described hereinbelow includes an automatic deduction flag, the various settings relating to the app refer to information in regard to automatic deductions, such as a credit card number or account information. Furthermore, for example, when a product identifier is included in the connection request signal, the product identifier may also be stored by the storage unit 230 as a setting relating to the app.

The touch panel 240, which is an example of a reception unit, is a device for receiving input from the user and for displaying various types of information. It should be noted that a device for receiving input from the user and a device for displaying the various types of information is not limited to this single-element configuration, as with the touch panel 240. For example, the device for receiving input from the user may be a keyboard or a mouse, various types of sensors or a wearable device, etc. Furthermore, the device for displaying various types of information may be a display, such as a liquid-crystal display or an organic electroluminescent (EL) display, or a wearable device, etc. Furthermore, these devices may be devices external to the portable terminal 200 that are connected to the portable terminal 200 via a universal serial bus (USB) or a display cable, etc.

The sensor 250 is a motion sensor for detecting acceleration of the portable terminal 200 in the horizontal and vertical directions. It should be noted that the sensor 250 may be realized using existing technology. The sensor 250 may be configured to sense other motion parameters, as well.

The communication unit 260, which is an example of a receiver, may be configured in such a way as to connect the portable terminal 200 to a network. The communication unit 260 may send and receive wireless signals conforming to communications standards, such as Bluetooth or wireless LAN. For example, the communication unit 260 may be realized by a LAN card, an analog modem or an ISDN modem, etc., and also by an interface for connecting communication components to a processor by way of a transmission line, such as a system bus, as understood in the art.

2-2. Functional Configuration of the Portable Terminal 200

The functions of the portable terminal 200 on which the app is installed are described hereinbelow. As shown in FIG. 2, the arithmetic processor 221 may be configured as functional units, including a launching unit 201, a connection request unit 202, and a settlement unit 203.

2-2-1. Launching Unit 201

In response to the portable terminal 200 receiving a first wireless signal, which is described hereinbelow, the launching unit 201 may cause the touch panel 240 to display a launch notification inciting launching of the app. The launching unit 201 may cause the touch panel 240 to display the launch notification using the function of an operating system (OS) of the portable terminal 200. Examples of launch notifications may include a pop-up displayed on the touch panel 240, a predetermined notification sound, an email, etc. Furthermore, the launching unit 201 may also automatically launch the app in response to the first wireless signal being received. It should be noted that when the first wireless signal has been received, the launching unit 201 may determine whether or not the app is running on the portable terminal 200, and a launch notification is not sent if the app is running 2-2-2. Connection Request Unit 202

The connection request unit 202 may send and receive wireless signals by controlling the communication unit 260. Specifically, if a user operation is received in response to the portable terminal 200 receiving a second wireless signal from the vending machine 10, and the field intensity of the second wireless signal is equal to or greater than a predetermined threshold, the connection request unit 202 may send the connection request signal by controlling the communication unit 260. The connection request signal may include the identifier for the sending portable terminal 200.

In response to the portable terminal 200 receiving the second wireless signal from a plurality of vending machines 10, the connection request unit 202 may control the communication unit 260 in such a way that a connection request signal is sent to the vending machine 10 that sends the second wireless signal having the strongest field intensity. The connection request unit 202 can select a vending machine 10 located close to the portable terminal 200 as the destination for the connection request signal by selecting the destination for the connection request signal in accordance with the field intensity. The connection request unit 202 may then determine whether or not the connection request signal can be sent in accordance with determining whether or not the field intensity of the second wireless signal sent by the vending machine 10 selected as the destination is equal to or greater than a predetermined threshold level. As a result, the connection request unit 202 can permit sending of the connection request signal only when the portable terminal 200 is within a predetermined distance of the selected vending machine 10. It should be noted that the connection request unit 202 may adjust the threshold level of the field intensity in accordance with the situation of the portable terminal 200.

According to this mode of the embodiment, a user operation is an operation that involves tapping the portable terminal 200 in order to impart an impact or vibration to the portable terminal 200. In addition to direct tapping of the portable terminal 200, the user operation may also include imparting vibration by tapping the portable terminal 200 from outside of a pocket or bag in which the portable terminal 200 is being stored. The vibration imparted to the portable terminal 200 may be detected by means of the sensor 280. In response to the sensor 280 detects the vibration, the connection request unit 202 may determine that a user operation has been received, and may send the connection request signal by controlling the communication unit 260.

It should be noted that the user operation is not limited to tapping of the portable terminal 200. For example, the user operation may include operations, such as pressing a predetermined button on the portable terminal 200, tapping a screen, inputting a predetermined command, using voice input, or shaking the portable terminal, for example. In addition, the connection request unit 202 may have a configuration in which the connection request signal is automatically sent when the second wireless signal has been received.

A description is given in this mode of embodiment of an exemplary configuration in which the connection request unit 202, may cause the communication unit 260 to send the connection request signal continuously for a predetermined time, but this is not limiting, and a configuration in which the connection request unit 202 causes the communication unit 260 to send the connection request signal at a predetermined period or only once is equally feasible.

In addition, if a user operation has not been received after the second wireless signal has been sent, even though a predetermined time has elapsed, the connection request unit 202 may include changing the vending machine 10 to which the connection request signal is sent in accordance with a field intensity of a second wireless signal once again received.

Furthermore, the connection request unit 202 is able to cancel, in accordance with a user operation, a connection established between the vending machine 10 and the portable terminal 200.

It should be noted that the connection request signal may also include an automatic deduction flag and a product identifier, for example.

The automatic deduction flag refers to a flag for indicating whether or not an automatic deduction is to be used for purchasing the product. For example, the user can preset in the app whether or not automatic deductions should be used. Existing technology may be used for automatic deductions, such as a withdrawal from an account or credit card payment, or a prepaid payment system.

Furthermore, the product identifier is an identifier for a product being purchased that may be preset by the user in the app. By presetting a product in the app, the user can purchase the desired product without operating the vending machine 10. It should be noted that the connection request unit 202 may also automatically set the identifier of a product purchased with high frequency in the app, in accordance with the product purchase history.

2-2-3. Settlement Unit 203

When a purchase completion signal to be described later is received by the communication unit 260 from the vending machine 10, the settlement unit 203 implements point addition processing in accordance with the cost of the product included in said purchase completion signal, and information relating to points. For the point addition processing, the settlement unit 203 may add the number of points on the current occasion to the total number of points by referring to the storage unit 230.

Furthermore, if the connection request signal includes the automatic deduction flag, the settlement unit 203 may also implement automatic deduction processing.

3. Configuration of the Vending Machine 10

3-1. Hardware Configuration of the Vending Machine 10

The configuration of the vending machine 10 according to a mode of embodiment is described hereinbelow with reference to FIG. 3.

Figure 3A:
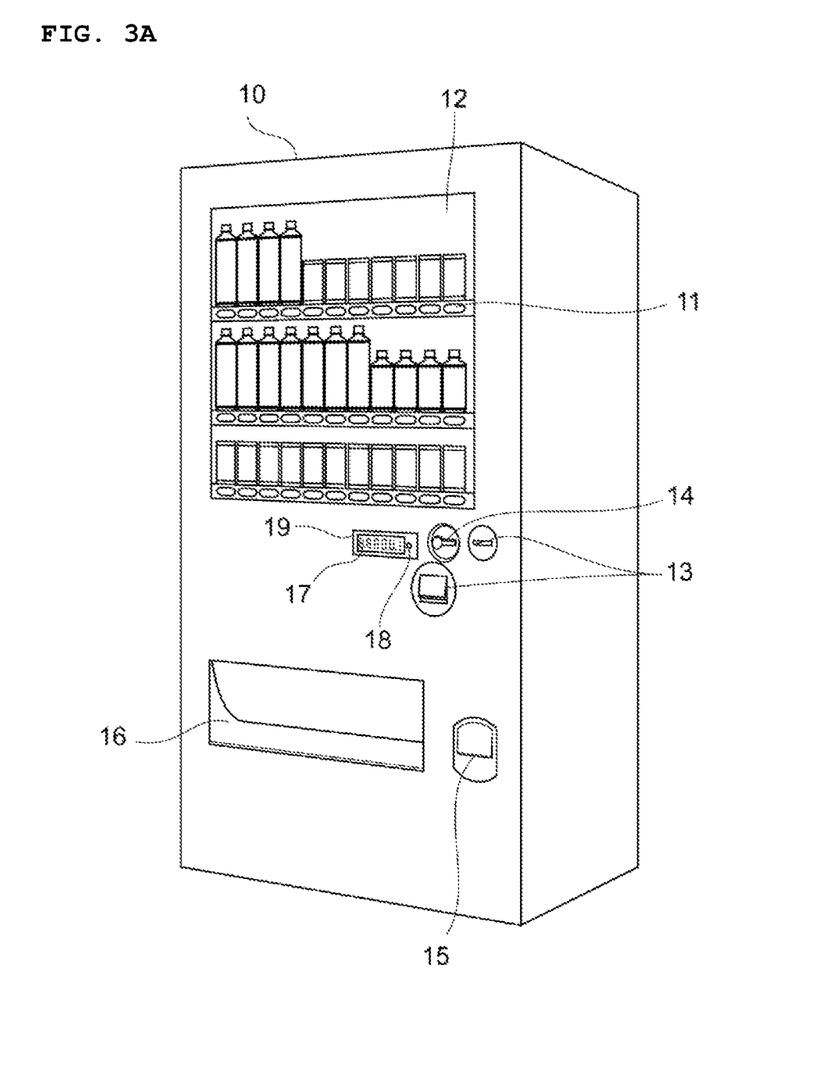
FIG. 3A is a structural diagram of a vending machine according to a first mode of an embodiment.

FIG. 3A is an oblique view illustrating an example of a hardware configuration of a vending machine 10. The vending machine 10 may include product selection buttons 11, a product sample display section 12, payment receiving sections 13, a return lever 14, a change return opening 15, a product retrieval opening 16, a display unit 17, a human sensor 18 (an example of the detector), and a wireless communication unit 19 (an example of the transmitter and receiver).

The product sample display section 12 is provided at an upper part of a front surface of the vending machine 10, and samples of products sold by the vending machine 10 are displayed therein. It should be noted that the product sample display section 12 may be a liquid-crystal display or a panel displaying product photographs or images.

The product selection buttons 11 may be provided below samples of products displayed in the product sample display section 12, where the product selection buttons 11 receive a product selection from a user.

The payment receiving sections 13 are provided below the product sample display section 12. The payment receiving sections 13 may include, for example, a coin slot, a banknote insertion slit, and a reader, or any combination thereof. The reader includes a reader for electronic money afforded by a contactless IC card or a mobile telephone, for example.

The return lever 14 may be provided below the product sample display section 12 and returns change from the change return opening 15 in accordance with a user operation. In addition, according to this mode of embodiment, when the return lever 14 is twisted by a user while a connection has been established between the vending machine 10 and the portable terminal 200, the return lever 14 sends to the wireless communication unit 19 a signal cancelling the connection established between the vending machine 10 and the portable terminal 200.

The change return opening 15 is provided below the payment receiving sections 13 and change is returned thereby.

The product retrieval opening 16 may be disposed at a lower part of a front surface of the vending machine 10, and a product selected by the user using the product selection buttons 11 may be issued therefrom.

A wireless communication unit 19 may be provided between the product sample display section 12 and the payment receiving sections 13, for example, and sends/receives wireless signals. The wireless communication unit 19 refers to a device able to send/receive wireless signals, such as Bluetooth or wireless LAN, by means of broadcast or unicast. The wireless communication unit 19 may further be configured to communicate over a broadband or wide area network.

In addition, the wireless communication unit 19 may send a plurality of different wireless signals. For example, the wireless communication unit 19 may send different types of wireless signals (Wi-Fi, Bluetooth, wireless LAN, etc.) and wireless signals having different transmission powers.

According to this mode of embodiment, the wireless communication unit 19 is able to adjust the transmission power by controlling a wireless control unit 103, as further described hereinafter. Specifically, the wireless communication unit 19 may adjust transmission power of radio waves sent, whereby it is possible to send a Bluetooth signal having a range of approximately 30 m (also referred to below as the "first wireless signal"), and a Bluetooth signal having a range of approximately 3 m (also referred to below as the "second wireless signal"). The first wireless signal may include product advertisement and campaign information, for example. Furthermore, the second wireless signal may include an identifier for the vending machine 10 sending the second wireless signal.

It should be noted that the first wireless signal and the second wireless signal are not limited to signals based on the same communication standard, and the first and second wireless signals may be signals based on different communication standards.

In addition, the wireless communication unit 19 may be configured in such a way as to receive the connection request signal and a purchase instruction signal. As previously described, the connection request signal is a signal that can be sent by the portable terminal 200 that receives the second wireless signal. The wireless communication unit 19 can therefore receive only a connection request signal sent from a portable terminal 200 positioned within the range of the second wireless signal from the vending machine 10.

According to this mode of embodiment, the display unit 17 is attached to the wireless communication unit 19 and displays the monetary amount of the product selected by the user using the product selection buttons 11. Furthermore, the display unit 17 is able to display an identifier of the portable terminal 200 included in the connection request signal by controlling an identification unit 104, which is described further herein.

According to this mode of embodiment, the human sensor (an example of the detector) 18 is provided in the wireless communication unit 19 and detects a person in the vicinity of the vending machine 10. In an embodiment, the human sensor 18 is a 24-GHz Doppler sensor or the like. Specifically, the human sensor 18 may detect a person positioned within any range of the vending machine 10, or detect a person by detecting an object (e.g., clothing or accessories etc.) on the person. It should be noted that the detectable range of the human sensor 18 may be preset by the operator of the connection management system 1.

In addition, the human sensor 18 may be configured to detect an approach of a person. In this case, the human sensor 18 is able to detect the action of a user approaching the vending machine 10 in order to retrieve a product from the product retrieval opening 16. Furthermore, the human sensor 18 is also able to detect a person remaining for a predetermined time within a predetermined range of the vending machine 10.

It should be noted that the human sensor 18 is not limited to a Doppler sensor provided that it is able to detect a person in the vicinity of the vending machine 10. For example, the human sensor 18 may be a camera or an infrared sensor. Furthermore, the position at which the human sensor 18 is attached is not limited to the wireless communication unit 19, and the sensor 18 may be attached at any position on the vending machine 10. For example, the sensor 18 may be attached to a front surface (outside, inside, or extending therethrough) of the vending machine 10. By providing the human sensor 18 on the front surface of the vending machine 10, it is possible to prevent erroneous detection of a person close to an adjacent vending machine 10 when a plurality of vending machines 10 lie adjacent to one another.

A product housing section for housing products, an issuing mechanism for issuing a product to the product retrieval opening 16, and a control device for controlling the vending machine 10 are further provided inside said vending machine 10, although these are not depicted in FIG. 3A.

3-2. Functional Configuration of the Vending Machine 10

Figure 3B:
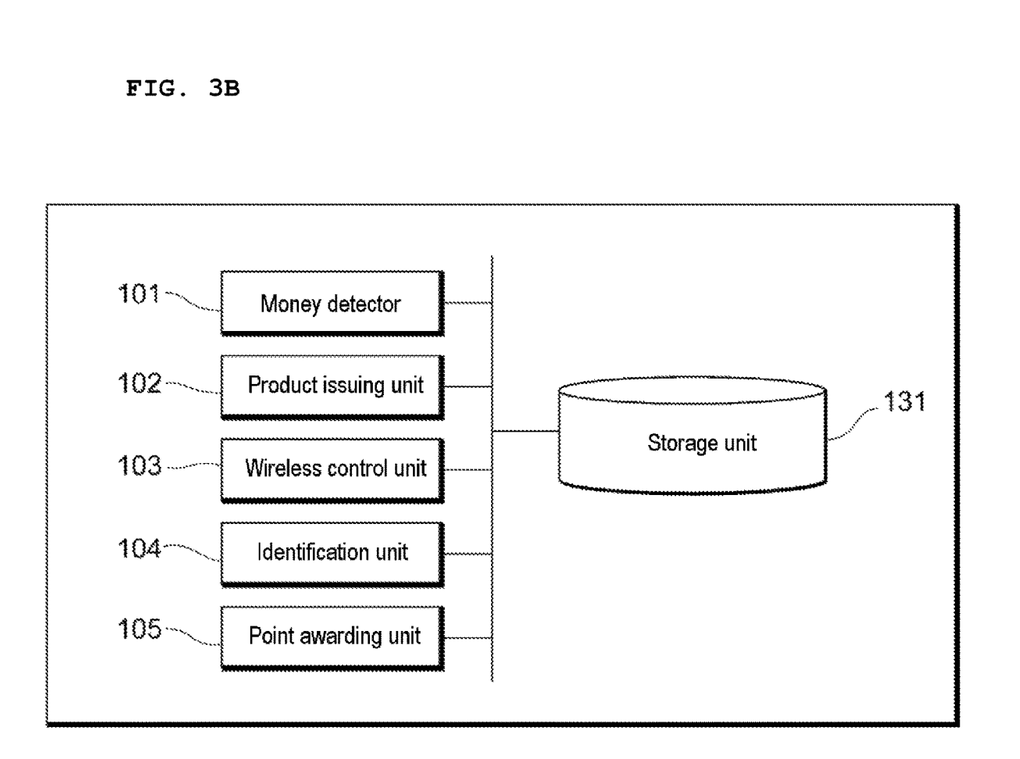
FIG. 3B is a functional block diagram of the vending machine of FIG. 3A according to a first mode of an embodiment.

FIG. 3B is a block diagram illustrating an example of the functional configuration of the vending machine 10. The vending machine 10 according to this mode of embodiment may include a money detector 101, a product issuing unit 102, a wireless control unit 103, an identification unit 104, a point awarding unit 105, and a storage unit 131.

3-2-1. Money Detector 101

The money detector 101 may detect that money for a product has been paid. In response to money being received by the payment receiving section 13 being an actual banknote, the money detector 101 may detect whether or not the money is genuine, and if the money inserted is genuine, calculate the total thereof. Alternatively, if the payment receiving section 13 has received electronic money, the money detector 101 may deduct cost of the selected product from the electronic money. It should be noted that the money detector 101 may be realized using existing technology.

3-2-2. Product Issuing Unit 102

The product issuing unit 102 may control an issuing mechanism in accordance with the product selected by the product selection buttons 11 and the money received by the payment receiving sections 13. In response to the money detector 101 detecting that money equal to or greater than the value of the selected product has been inserted, the product issuing unit 102 may control the issuing mechanism so that the selected product is issued to the product retrieval opening 16. Furthermore, if the money inserted is greater than the value of the selected product, the product issuing unit 102 may return change from the change return opening 15 or from the banknote insertion slit.

In addition, in response to the wireless communication unit 19 receiving a connection request signal bearing an automatic deduction flag, the product issuing unit 102 may issue the selected product to the product retrieval opening 16.

3-2-3. Wireless Control Unit 103

In response to the human sensor 18 detecting that a person is in a position within a predetermined range of the vending machine 10 (also referred to below as "ON"), the wireless control unit 103 may send a wireless signal by controlling the wireless communication unit 19. Specifically, the wireless control unit 103 may continuously send the first wireless signal, and when the human sensor 18 is ON, the wireless control unit 103 may control the transmission power in the wireless communication unit 19 in such a way that the first wireless signal and the second wireless signal are sent alternately at a predetermined period. It should be noted that the wireless control unit 103 may equally have a configuration for performing control in such a way that the wireless signal sent by the wireless communication unit 19 during an ON period and an OFF period is switched from the first wireless signal to the second wireless signal. Alternative communications protocols may be utilized that achieve the same or similar results.

The wireless control unit 103, according to this mode of embodiment, may control the wireless communication unit 19 in such a way that the second wireless signal is sent only when the human sensor 18 is ON. As a result, it is possible to limit the portable terminal 200 able to receive the second wireless signal to a portable terminal 200 in proximity to the vending machine 10.

3-2-4. Identification Unit 104

The identification unit 104 may identify, in accordance with a connection request signal, the portable terminal 200 connecting to the vending machine 10, and establish a connection with the portable terminal 200 identified. For example, the identification unit 104 may identify the portable terminal 200 establishing a connection with the vending machine 10, in accordance with an order in which connection request signals are received by the wireless communication unit 19. Specifically, when connection request signals are received from a plurality of portable terminals 200, the identification unit 104 may identify the portable terminal 200 from which a connection request signal was first received as the portable terminal connecting to the vending machine 10. As a result, in response to connection request signals being received from a plurality of portable terminals 200, the identification unit 104 may select, as the partnering connection, a portable terminal 200 located in proximity in accordance with the vending machine 10.

Furthermore, the identification unit 104 may identify the portable terminal 200 connecting to the vending machine 10 in accordance with field intensity of the connection request signal, for example. In this case, the identification unit 104 may identify, from among the plurality of portable terminals 200, a portable terminal 200 sending a connection request signal having a high field intensity, as the portable terminal 200 connecting to the vending machine 10.

In addition, the identification unit 104 may control the display unit 17 in such a way as to display the identifier of the portable terminal 200 identified. As a result, the user is able to visually confirm whether or not the portable terminal 200 connected to the vending machine 10 from which the user is attempting to purchase a product is his or her own portable terminal.

3-2-5. Point Awarding Unit 105

In response to the product issuing unit 102 issuing a product (e.g., dispensing a beverage), the point awarding unit 105 may control the wireless communication unit 19 so that a purchase completion signal is sent to the portable terminal 200 currently in communication with the vending machine 10. The purchase completion signal may include an identifier for a product purchased, a date and time of purchase, an identifier for the vending machine 10 from which the product was purchased, points added at the time of purchase, and an identifier for "hot" or "cold" in regard to the product purchased, for example. Other information may also be communicated from the vending machine 10 to the portable terminal 200.

3-2-6. Storage Unit 131

The storage unit 131 may store data used for the functional units of the vending machine 10 to implement processing. For example, the product identifier, cost, and points awarded may be stored in association in the storage unit 131. An identifier of the vending machine 10 may further be stored in the storage unit 131, for example.

4. Processing Flow 4-1. Processing for Identifying a Connecting Portable Terminal from a Plurality of Portable Terminals 200

Figure 4:
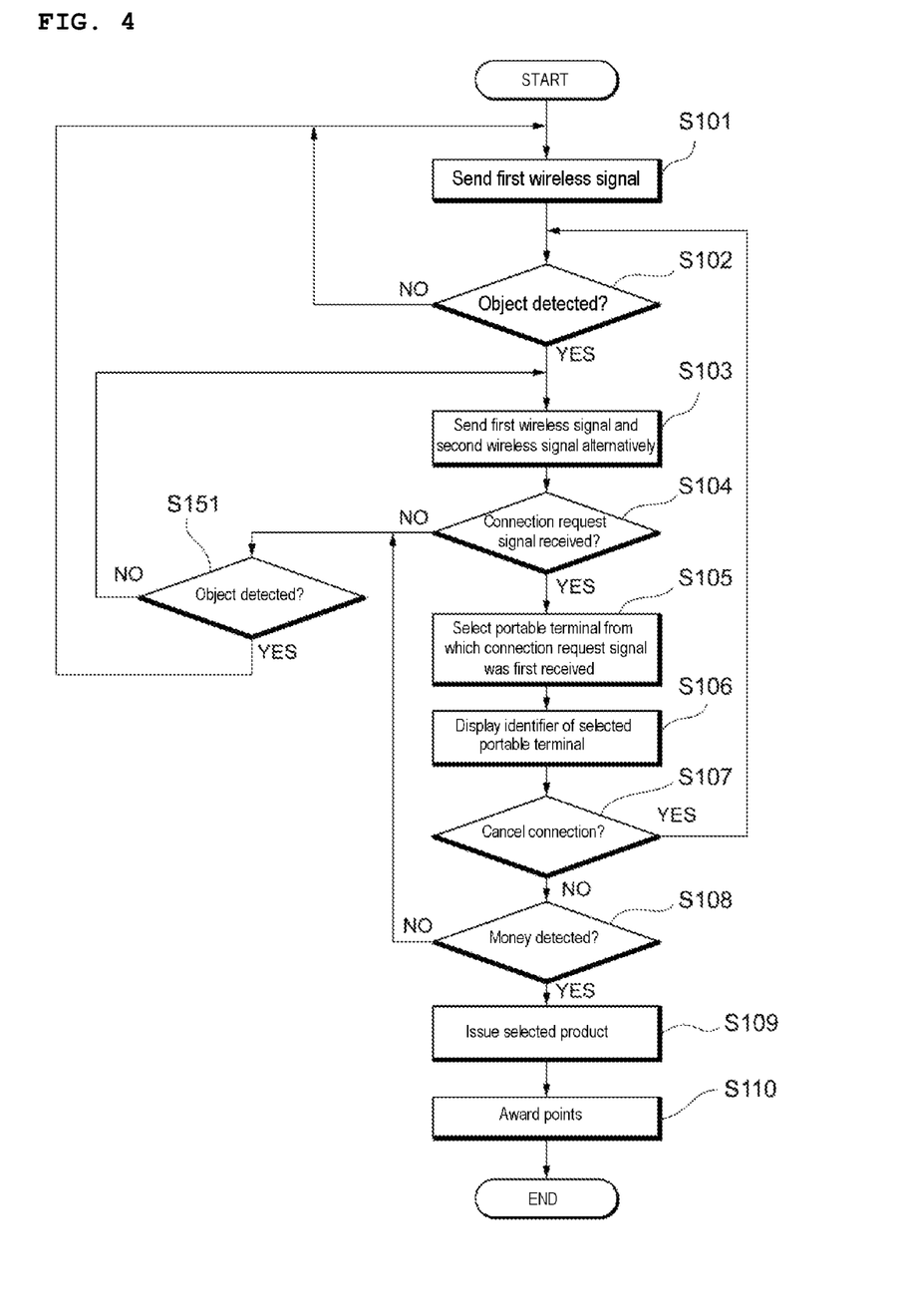
FIG. 4 is a flow diagram that illustrates an example of a processing flow in the vending machine of FIG. 3A according to a first mode of an embodiment.

FIG. 4 is a flowchart illustrating an example of a processing flow in which the vending machine 10A may identify, from a plurality of the portable terminals 200, the portable terminal 200A of a user (also referred to below as "the user A") purchasing a product from the vending machine 10A. FIG. 4 illustrates an exemplary case in which a portable terminal 200B is present within the range of the second wireless signal from the vending machine 10A (the user having the portable terminal 200B is referred to as "the user B").

The transmitter 103 of the vending machine 10A may continuously send the first wireless signal (S101). When the user A comes close to the vending machine 10A and the human sensor 18 of the vending machine 10A is ON (S102: YES), the wireless control unit 103 may control the wireless communication unit 19 so that the first wireless signal and the second wireless signal are sent alternately (S103). Alternative communications protocols may be utilized.

If the wireless communication unit 19 does not receive a connection request signal (S104: NO) and a predetermined time has elapsed (S151: YES), then the wireless control unit 103 may control the wireless communication unit 19 in such a way as to halt transmission of the second wireless signal.

If the wireless communication unit 19 has received a plurality of connection request signals (S104: YES), then the identification unit 104 may identify the portable terminal that sent the connection request signal first received as being the portable terminal closest to the vending machine 10A and establish a connection with that portable terminal (S105). For example, if the user B in proximity to the vending machine 10A causes the portable terminal 200B to send a connection request signal in order to unfairly take the points of user A or the like, then the wireless communication unit 19 may receive multiple connection request signals.

The identification unit 104 may causes the display unit 17 to display an identifier of the portable terminal with which a connection has been established (S106). The user A may visually confirm the identifier displayed on the display unit 17, and if the identifier is not the identifier of the user's own portable terminal 200A, then the user can cancel the connection by twisting the return lever 14. It is therefore possible to prevent another user from unfairly taking points by virtue of the fact that the display unit 17 displays the identifier of the portable terminal 200 currently connected.

On the other hand, if the identifier displayed on the display unit 17 is the identifier of the portable terminal 200A, then the user A may select a product using the product selection buttons 11 and insert money for the product into the money receiving section 13 in order to purchase the product. It should be noted that when a connection between the portable terminal 200A and the vending machine 10A has been established, the user A may still cancel the connection if he or she wishes to cancel purchase of the product, even if the portable terminal 200A is operated (S107).

If the money detector 101 of the vending machine 10A detects money commensurate with the cost of the product (S108: YES), then the product issuing unit 102 may issue the selected product to the product retrieval opening 16 (S109). It should be noted that the product issuing unit 102 may also issue the product if an automatic deduction flag contained in the connection request signal has been detected.

When the product is issued to the product retrieval opening 16, the point awarding unit 105 may send a purchase completion signal to the portable terminal 200A (S110).

The vending machine 10A, according to this mode of embodiment, thus may send the second wireless signal having a short range only when the human sensor 18 is ON. As a result, it is possible to limit the portable terminals 200 able to send a connection request signal to a portable terminal in proximity to the vending machine 10.

4-2. Processing for Identifying a Vending Machine for Connection from a Plurality of the Vending Machines 10

Figure 5:
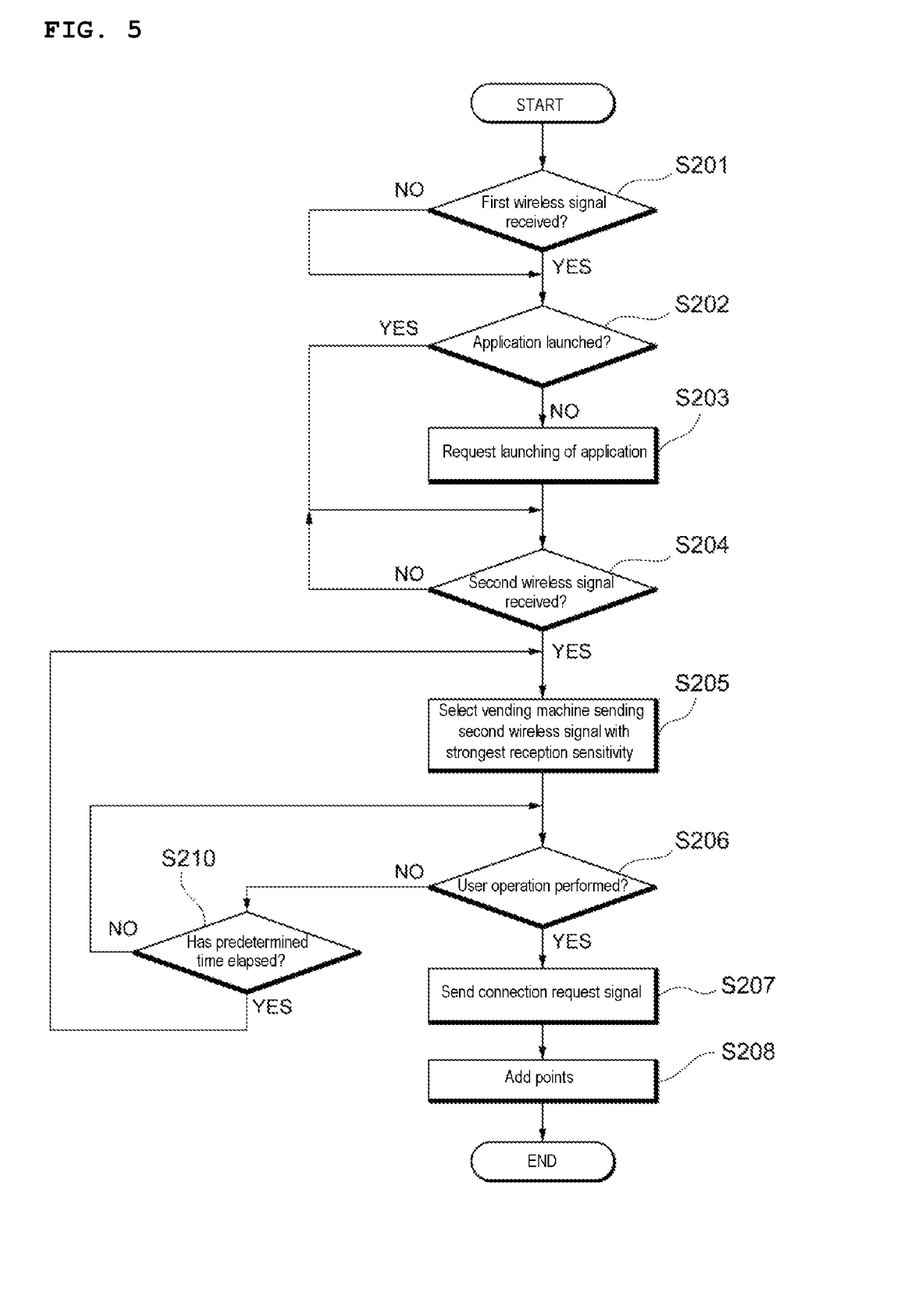
FIG. 5 is an illustration that illustrates an example of a processing flow in the portable terminal of FIG. 2 according to a first mode of an embodiment.

With regard to FIG. 5, a processing flow for processing in which the portable terminal 200A identifies a vending machine 10A from which the user A is purchasing a product from among a plurality of the vending machines 10 is shown.

If the portable terminal 200A receives the first wireless signal (S201: YES) while the user A is moving toward the vending machine 10A, the launching unit 201 may determine whether or not the app has been launched. If the app has still not been launched in the portable terminal 200A (S202: NO), the launching unit 201 may display a launch notification for the app on the touch panel 240 requesting launching of the app (S203). It should be noted that in this case the launching unit 201 may automatically launch the app.

Meanwhile, if the app has already been launched in the portable terminal 200A (S202: YES), then the launching unit 201 does not provide a launch notification.

When the user A approaches the vending machine 10A and the human sensor 18 of the vending machine 10A is ON, the second wireless signal may be sent from the vending machine 10A. When the communication unit 260 of the portable terminal 200A receives the second wireless signal (S204: YES), the connection request unit 202 may select as the connection destination the vending machine sending the second wireless signal with the strongest reception sensitivity in the communication unit 260 (S205). For example, if the user A approaches the vending machine 10A when a vending machine 10B is disposed adjacent or proximate to the vending machine 10A, then the human sensor may also be turned ON in the vending machine 10B. Furthermore, there may also be times when the human sensor 18 in the vending machine 10B is turned ON as a result of a separate user B approaching the vending machine 10B at the same time as the user A approaches the vending machine 10A. In such cases, the connection request unit 202 may select the vending machine 10 that sent the second wireless signal having the strongest reception sensitivity, and it is possible as a result to identify the vending machine 10 in proximity according to the user A. In addition, the connection request unit 202 may determine whether or not the field intensity of the second wireless signal sent by the vending machine 10A is equal to or greater than a predetermined threshold. If the field intensity is equal to or greater than the predetermined threshold, the connection request unit 202 may determine that the portable terminal 200A is within a predetermined distance of the vending machine 10A and is able to send a connection request signal.

In order to purchase the product from the vending machine 10A, the user A may tap the portable terminal 200A and impart vibration thereto in order to establish a connection with the vending machine 10A. In response to the sensor 250 in the portable terminal 200A detecting this vibration (S206: YES) in a state in which the communication unit 260 is receiving the second wireless signal, then the connection request unit 202 may send a connection request signal to the vending machine 10A (S207).

The identifier of the portable terminal 200A may be displayed on the display unit 17 of the vending machine 10A that has received the connection request signal. The user may be able to visually confirm that the identifier is that of the portable terminal 200A. If the identifier displayed on the display unit 17 is the identifier of the portable terminal 200A, a product may selected using the product selection buttons 11 and money for the product may be inserted into the payment receiving section 13 in order to purchase the product.

In response to a purchase completion notification is received from the vending machine 10A, the settlement unit 203 may implement the abovementioned point addition processing (S208).

The portable terminal 200, according to this mode of embodiment, may thus send a connection request signal in response to the second wireless signal being received. As a result, it is possible to limit the vending machine 10 receiving the connection request signal to a vending machine 10 located in proximity to the portable terminal 200. The connection management system 1, according to this mode of embodiment, therefore makes it possible to identify a combination of a plurality of vending machines 10 and a plurality of portable terminals 200 on a one-to-one basis.

Second Mode of Embodiment

Matters in common to the first mode of embodiment are not described hereinbelow for other modes of embodiment.

According to this mode of embodiment, the vending machine 10 may send a sound wave in accordance with the period in which the wireless communication unit 19 sends a wireless signal. In this case, the portable terminal 200 may send the difference in the arrival time of the wireless signal and the soundwave as the connection request signal.

The identification unit 104 may be able to estimate the distance between the vending machine 10 and the portable terminal 200 from the difference in time at which the wireless signal and the soundwave arrive at the portable terminal 200. The identification unit 104 may identify the portable terminal 200 closest to the vending machine 10 from the estimated distance and causes the wireless communication unit 19 to establish a connection.

It should be noted that in this mode of embodiment, the wireless communication unit 19 is not limited to a configuration in which two types of wireless signal may be sent. Furthermore, a configuration in which the identifier of the portable terminal 200 is not displayed on the display unit 17 may alternatively be utilized.

The identification unit 104, according to this mode of embodiment, thus estimates the distance between the vending machine 10 and the portable terminal 200 in accordance with the difference in the arrival time of the wireless signal and the soundwave. The reception sensitivity of the portable terminal 200 to the wireless signal is affected by external factors, such as the state, etc., of the portable terminal 200 (whether the portable terminal 200 is being held in a user's hand or carried in a bag, etc.). The identification unit 104 according to this mode of embodiment is able to estimate the correct distance without being affected by the state, etc., of the portable terminal 200 by virtue of the fact that a difference in arrival time of the wireless signal and the soundwave is used for estimating distance between the vending machine 10 and the portable terminal 200.

The other constituent elements of the connection management system 1 may be the same or similar as described in the first mode of embodiment.

Third Mode of Embodiment

According to this mode of embodiment, the user may place the portable terminal 200 in contact with the vending machine 10 in order to cause the connection request unit 202 to send the connection request signal. The sensor 280 of the portable terminal 200 may detect the waveform of an impact imparted during the contact. The connection request unit 202 may send the detected waveform to the vending machine 10 as a connection request signal. It should be noted that in this mode of embodiment, the connection request signal may also serve as the purchase instruction signal.

The other constituent elements and functions of the portable terminal 200 may be the same or similar as in the first mode of embodiment.

According to this mode of embodiment, the vending machine 10 may include a motion sensor in addition to the constituent elements of the first mode of embodiment. The motion sensor in the vending machine 10 may detect the waveform of an impact imparted when the user places the portable terminal 200 in contact with the vending machine 10.

If the waveform included in the connection request signal and the waveform detected by the motion sensor in the vending machine 10 are determined to match, the identification unit 104 is able to identify, as the partnering connection, the portable terminal 200 that sent the connection request signal. It should be noted that in the present mode of embodiment, the vending machine 10 does not have to comprise the human sensor 18.

The other constituent elements and functions of the vending machine 10 may be the same or similar as in the first mode of embodiment.

The identification unit 104, according to this mode of embodiment, thus may identify the portable terminal 200 connecting to the vending machine 10 according to whether or not the impact waveform matches when the portable terminal 200 is in communication with the vending machine 10. As a result, the portable terminal 200 connecting to the vending machine 10 can be identified more precisely.

The other constituent elements and functions of the connection management system 1 may be the same or similar as in the first mode of embodiment.

Other Modes of Embodiment

The modes of embodiment described above are provided to assist with an understanding of the present invention, but should not be interpreted as limiting. The present invention may be modified/improved without any departure from the essential point thereof and any such equivalents are included in the present invention. Furthermore, modes of embodiment were illustrated, but it is possible to partially substitute or combine constituent elements indicated in the different modes of embodiment, and any such changes are included within the scope of the present invention.

For example, when the connection request signal includes an automatic deduction flag, it is possible to adopt a configuration in which the identification unit 104 goes on standby for a given period after the identifier of the portable terminal 200 currently connected has been displayed on the display unit 17 in response to the connection request signal being received. In this case, the product issuing unit 102 may issue the product if the connection has not been cancelled as a result of the return lever 14 being twisted within a given period, etc.

Furthermore, the connection request unit 202 may have a configuration in which a connection request signal is sent twice in accordance with a user operation, namely when a connection request is made and when a product is purchased. In this case, the automatic deduction flag may not be included in a first connection request signal, and an automatic deduction flag may be included in a second connection request signal. Specifically, the user is able to send the connection request signal to the connection request unit 202 by tapping the portable terminal 200 twice, namely when the user places the portable terminal 200 in contact with the vending machine 10, and in response to the user confirming the identifier displayed on the display unit 17.

KEY TO SYMBOLS

1 Connection management system
10A-10C Vending machine
11 Product selection button
12 Product sample display section
13 Payment receiving section
14 Return lever
15 Change return opening
16 Product retrieval opening
17 Display unit
18 Human sensor
19 Wireless communication unit
101 Money detector
102 Product issuing unit
103 Wireless control unit
104 Identification unit
105 Point awarding unit
131 Storage unit
200A-200C Portable terminal
201 Launching unit
202 Connection request unit
203 Settlement unit
230 Storage unit The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

The invention claimed is:

1. A machine for managing a connection with a portable terminal, said machine comprising:
a display unit;
a detector;
a transmitter;
a receiver; and
a processor configured by machine readable instructions to:
broadcast, via the transmitter, a first wireless signal to portable terminals within range of the machine, the first wireless signal causing the portable terminal to display a launch notification for automatic launching and display of an application on the portable terminal;
detect, via the detector, a person located within a predetermined range of the machine for at least a predetermined time;
transmit, via the transmitter, a second wireless signal to a portable terminal of the person, in response to the detector detecting the person within the predetermined range of the machine, wherein the second wireless signal is different from the first wireless signal and the second wireless signal has a weaker transmission power than the first wireless signal;
receive, via the receiver, a connection request signal from the portable terminal that has received the second wireless signal, the connection request signal including an identifier of the portable terminal;
identify, in response to receiving the connection request signal, the portable terminal connecting to the machine;
establish, in response to receiving the connection request signal and after the portable terminal has received the second wireless signal, a connection with the identified portable terminal;
display, in response to establishing the connection, the identifier of the portable terminal on the display unit;
receive a selection of a product for dispensing by the machine, the selection received responsive to the user confirming the identifier displayed on the display unit; and
award one or more points to the identified portable terminal with which connection has been established responsive to a purchase of the product.

2. The machine as claimed in claim 1, wherein the processor is further configured to identify a portable terminal connecting to the machine based on an order in which connection request signals are received.

3. The machine as claimed in claim 1, wherein the processor is further configured to cause information relating to a portable terminal with which connection has been established to be displayed on a display unit of the machine.

4. The machine as claimed in claim 1, further comprising a dispensing mechanism configured to dispense a beverage.

5. The machine as claimed in claim 1, wherein the machine is a beverage dispenser.

6. The machine of claim 1, wherein the processor is further configured to send a purchase completion signal to the identified portable terminal with which connection has been established.

7. The machine of claim 1, wherein the purchase completion signal includes point added at the time of purchase.

8. A method of managing a machine, said method comprising:
broadcasting, via a transmitter, a first wireless signal to portable terminals within range of the machine, the first wireless signal causing the portable terminals to display a launch notification for automatic launching and display of an application on the portable terminal;
detecting a person remaining for a predetermined time within a predetermined range of the machine;
transmitting, via the transmitter, a second wireless signal to a portable terminal in response to detecting the person within the predetermined range of the machine, wherein the second wireless signal is different than the first wireless signal and the second wireless signal has a weaker transmission power than the first wireless signal;
receiving a connection request signal from the portable terminal associated with the person that has received the second wirelss signal, the connection request signal including an identifier of the portable terminal;
in response to receiving the connection request signal:
identifying a portable terminal connecting to the machine;
establishing, in response to receiving the connection request signal and after the portable terminal has received the second wireless signal, a connection with the identified portable terminal;
displaying, in response to establishing the connection, the identifier of the portable terminal on a display unit of the machine;
receiving a selection of a product for dispensing by the machine, the selection received responsive to the user confirming the identifier displayed on the display unit; and
awarding one or more points to the identified portable terminal with which connection has been established responsive to a purchase of the product.

9. The method as claimed in claim 8, further comprising identifying a portable terminal connecting to the machine based on an order in which connection request signals are received.

10. The method as claimed in claim 8, further comprising causing information relating to a portable terminal with which a connection has been established to be displayed on a display unit of the machine.

11. The method according to claim 8, further comprising:
receiving payment from the person;
receiving a request to vend a beverage; and
responsive to receiving the request, vending a requested beverage.

12. The method according to claim 8, further comprising, in response to receiving a request to dispense a beverage, dispensing the requested beverage.

* * * * *